(12) United States Patent
Sinusas et al.

(10) Patent No.: US 10,752,360 B2
(45) Date of Patent: Aug. 25, 2020

(54) AIRCRAFT RESTRAINT SYSTEMS WITH FIXED DEFAULT MODE

(71) Applicant: Textron Innovations Inc., Providence, RI (US)

(72) Inventors: Eric A. Sinusas, Euless, TX (US); Olivier Andre Boisvert, Mirabel (CA); Guillaume Noiseux-Boucher, Mirabel (CA); Steve Loveland, Keller, TX (US); Sebastien Duval, Terrebonne (CA)

(73) Assignee: Textron Innovations Inc., Providence, RI (US)

( * ) Notice: Subject to any disclaimer, the term of this patent is extended or adjusted under 35 U.S.C. 154(b) by 402 days.

(21) Appl. No.: 15/832,689

(22) Filed: Dec. 5, 2017

(65) Prior Publication Data

US 2019/0168878 A1    Jun. 6, 2019

(51) Int. Cl.
*B64D 11/06*      (2006.01)
*B60R 22/343*     (2006.01)
*B60R 22/347*     (2006.01)
*B60R 22/415*     (2006.01)
*B60R 22/44*      (2006.01)

(52) U.S. Cl.
CPC .......... *B64D 11/062* (2014.12); *B60R 22/343* (2013.01); *B60R 22/347* (2013.01); *B60R 22/415* (2013.01); *B60R 2022/4433* (2013.01)

(58) Field of Classification Search
CPC ..... B64D 11/062; B64D 25/02; B60R 22/415; B60R 22/347; B60R 22/343; B60R 2022/4433
See application file for complete search history.

(56) References Cited

U.S. PATENT DOCUMENTS 2,480,335 A  *  8/1949  Nordmark ............... B60R 22/26
                                                     297/480
2,845,234 A     7/1958  Cushion et al.
                (Continued)

FOREIGN PATENT DOCUMENTS

WO    2010027269 A1    3/2010

OTHER PUBLICATIONS

European Exam Report; Application No. EP 18207393.2; European Patent Office; dated Jun. 3, 2019.
(Continued)

*Primary Examiner* — Magdalena Topolski
(74) *Attorney, Agent, or Firm* — Lawrence Youst PLLC

(57) ABSTRACT

A modal restraint system for an occupant of a seat of an aircraft includes a strap feeder unit and a strap selectively retractable into and extendable from the strap feeder unit. The strap is positionable adjacent to the occupant so as to dispose the occupant between the strap and the seat. The strap feeder unit is adapted to switch between a plurality of modes including a fixed mode and an unfixed mode. The strap is substantially unextendable from the strap feeder unit in the fixed mode. The strap is extendable from and retractable into the strap feeder unit in the unfixed mode. The strap feeder unit is in the fixed mode by default. The strap feeder unit is operable to switch to the unfixed mode in response to a user input, thereby increasing freedom of movement of the occupant relative to the seat of the aircraft.

19 Claims, 7 Drawing Sheets

(56) References Cited

U.S. PATENT DOCUMENTS

| | | | |
|---|---|---|---|
| 2,899,146 A * | 8/1959 | Barecki | B60R 22/38 |
| | | | 242/382.4 |
| 3,386,683 A * | 6/1968 | Howland | B64D 25/02 |
| | | | 242/374 |
| 4,090,735 A | 5/1978 | Czernakowski | |
| 4,277,037 A | 7/1981 | Loose et al. | |
| 4,566,649 A | 1/1986 | Petersen | |
| 4,667,904 A | 5/1987 | Herndon | |
| 4,732,409 A | 3/1988 | Colasanti | |
| 7,438,150 B2 | 10/2008 | Higashiyama | |
| 7,513,575 B1 * | 4/2009 | Go | B60N 2/688 |
| | | | 297/486 |
| 2003/0160497 A1 | 8/2003 | Darr | |
| 2004/0017073 A1 | 1/2004 | Pavlov et al. | |
| 2004/0036345 A1 | 2/2004 | Herberg et al. | |
| 2006/0082126 A1 | 4/2006 | Clute | |
| 2009/0261568 A1 | 10/2009 | Ehlers | |
| 2011/0001312 A1 | 1/2011 | Schubert et al. | |
| 2017/0283079 A1 | 10/2017 | Meadows et al. | |

OTHER PUBLICATIONS

European Search Report; Application No. EP 18207393.2; European Patent Office; dated May 21, 2019.

* cited by examiner

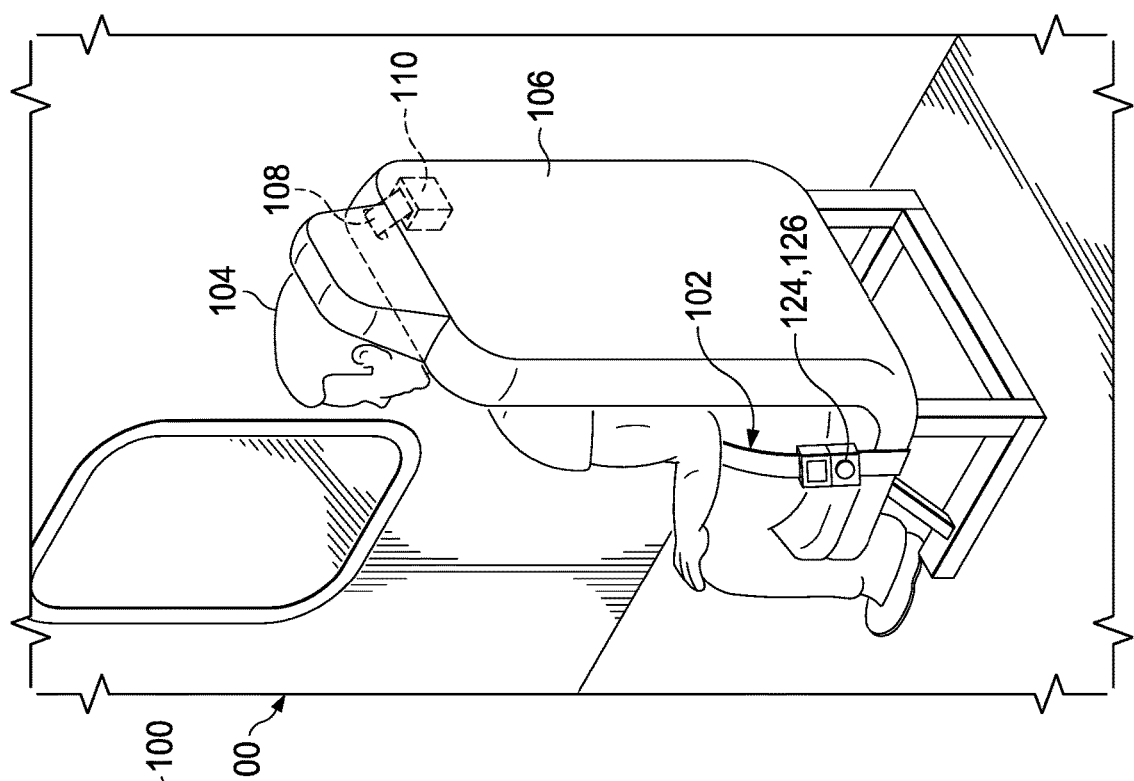
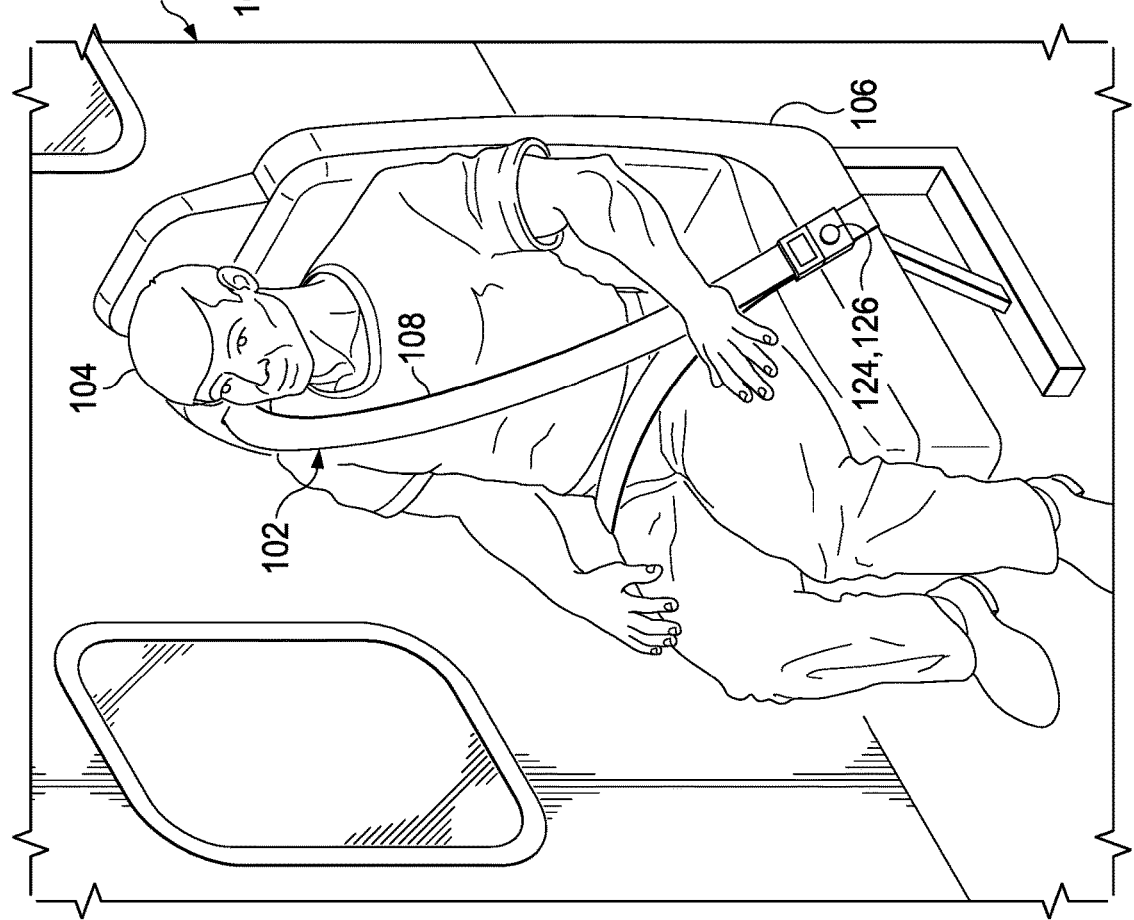
FIG. 2A
FIG. 2B

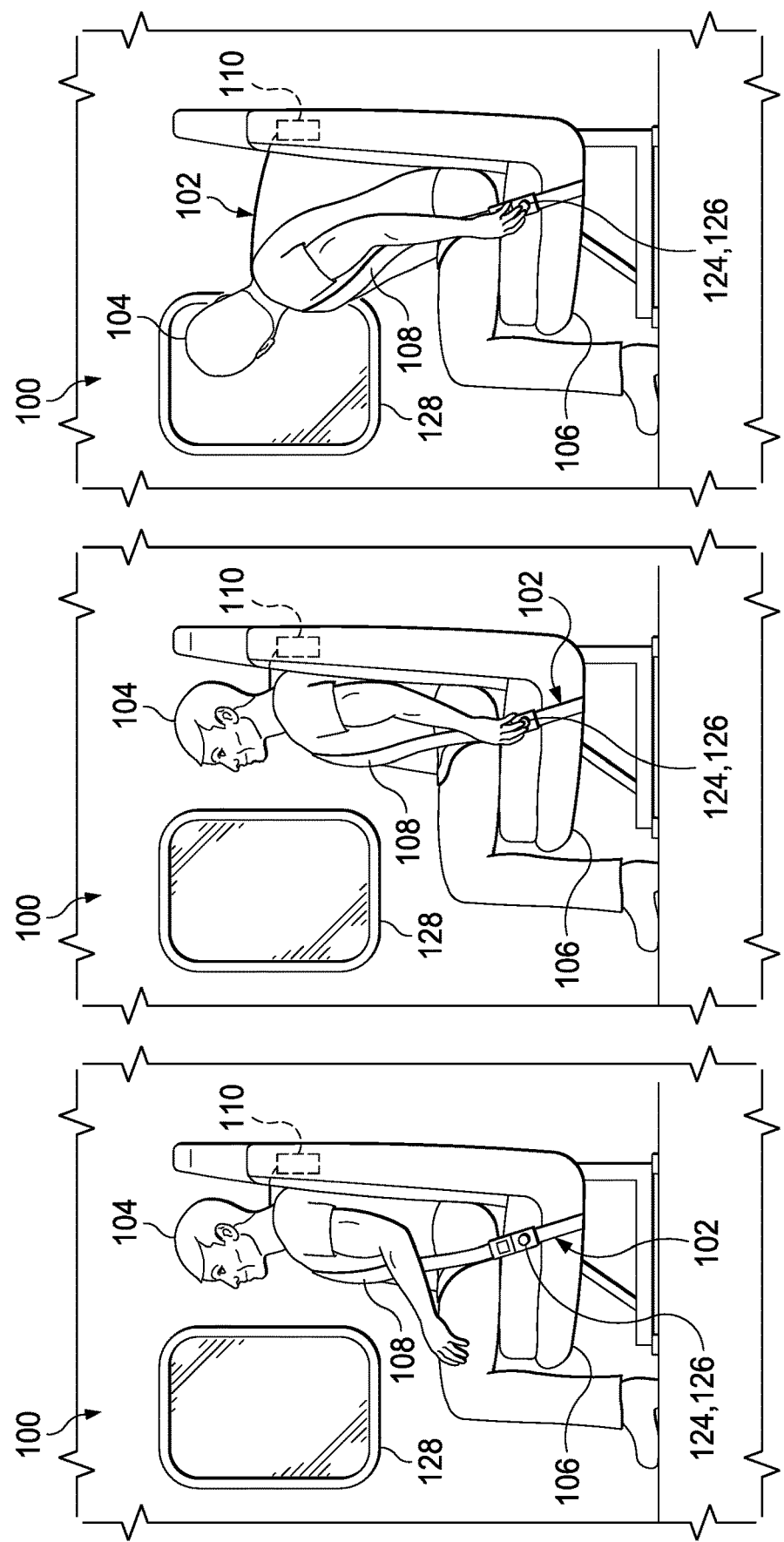

AIRCRAFT RESTRAINT SYSTEMS WITH FIXED DEFAULT MODE

TECHNICAL FIELD OF THE DISCLOSURE

The present disclosure relates, in general, to aircraft restraint systems and, in particular, to modal aircraft restraint systems having two or more modes of operation including a fixed mode and an unfixed mode, of which the former is the default mode of operation.

BACKGROUND

To promote the safety of aircraft occupants, aircraft must meet certain head injury criteria (HIC) requirements. To meet HIC requirements, the head movements of an aircraft occupant in an HIC event should result in a minimal or below-threshold head injury. For example, aircraft certification in the United States requires engineers to demonstrate that a head strike into any one of several cabin furnishings complies with the HIC requirements specified in 14 C.F.R § 23.562 and 14 C.F.R § 25.562. HIC requirements may be satisfied in several ways, such as by providing head clearance and/or soft impact surfaces around the aircraft occupant. Both of these solutions, however, add cost and weight to the aircraft.

Aircraft must include restraint systems to enhance occupant safety. For example, some aircraft include fixed seatbelts, which have a strap that does not extend in response to the bodily movement of the occupant. While fixed seatbelts may provide a short HIC trajectory, allowing for smaller seat pitch installation, fixed seatbelts are uncomfortable and may severely limit the mobility of the occupant, including hampering the pilot's ability to reach controls and look through windows. Other aircraft include inertia reel seatbelts, which have a strap that is extendable or retractable except when occupant movement reaches a threshold that causes the inertia reel to lock, preventing further extension of the strap. Inertia reel seatbelts have a delayed reaction time for locking the occupant into a secured position, resulting in increased head motion than that allowed by a fixed seatbelt. Accordingly, a need has arisen for a modal restraint system that provides a similar or superior range of head motion as compared to a fixed seatbelt, while also increasing occupant comfort and mobility.

SUMMARY

In a first aspect, the present disclosure is directed to a modal restraint system for an occupant of a seat of an aircraft. The modal restraint system includes a strap feeder unit and a strap selectively retractable into and extendable from the strap feeder unit. The strap is positionable adjacent to the occupant so as to dispose the occupant between the strap and the seat. The strap feeder unit is adapted to switch between a plurality of modes including a fixed mode and an unfixed mode. The strap is substantially unextendable from the strap feeder unit in the fixed mode. The strap is extendable from and retractable into the strap feeder unit in the unfixed mode. The strap feeder unit is in the fixed mode by default. The strap feeder unit is operable to switch to the unfixed mode in response to a user input, thereby increasing freedom of movement of the occupant relative to the seat of the aircraft.

In some embodiments, the strap feeder unit may include a spool operable to rotate in first and second directions to wind and unwind the strap thereabout, respectively. In certain embodiments, the strap feeder unit may include a locking module, the locking module engaging with the spool when the strap feeder unit is in the fixed mode to impede the spool from rotating in the second direction such that the strap is substantially unextendable. In some embodiments, the plurality of modes may include a retracted fixed mode and the strap feeder unit may include a retraction module adapted to rotate the spool in the first direction to retract the strap into the strap feeder unit in the retracted fixed mode, thereby tightening the strap against the occupant. In certain embodiments, the unfixed mode may include an inertia reel mode and the strap feeder unit may include an inertia reel subassembly selectively engagable with the spool in the inertia reel mode. In some embodiments, the strap may include a torso strap positionable adjacent to the torso of the occupant. In other embodiments, the strap may include a lap strap positionable adjacent to the lap region of the occupant.

In certain embodiments, the strap feeder unit may be further operable to switch to one of the fixed default mode or the retracted fixed mode in response to a cessation of the user input. In some embodiments, the strap feeder unit may be further operable to switch to one of the fixed default mode or the retracted fixed mode in response to a cessation of a predetermined time period. In certain embodiments, the strap feeder unit may be further operable to revert to the retracted fixed mode in response to a precautionary event. In some embodiments, the precautionary event may anticipate a life-threatening acceleration event. In certain embodiments, the life-threatening acceleration event may include a hard landing, a collision, an uncontrolled descent or turbulence. In some embodiments, reverting the strap feeder unit to the retracted fixed mode in response to the precautionary event may reduce the freedom of movement of the occupant during the life-threatening acceleration event.

In certain embodiments, the modal restraint system may include a release selector in communication with the strap feeder unit, and the user input may include selection of the release selector by the occupant. In some embodiments, the release selector may be switchable between a release position and an unrelease position, and the user input may include switching the release selector from the unrelease position to the release position. In certain embodiments, the release selector may include a button, the user input may include pressing of the button by the occupant and the strap feeder unit may be further operable to switch to the fixed mode in response to release of the button by the occupant. In some embodiments, the release selector may include an input device such as a button, a lever, a knob or a pull cord. In certain embodiments, the release selector may be proximate to the seat. In certain embodiments, the release selector may be disabled in response to a precautionary event, thereby preventing the strap feeder unit from switching to the unfixed mode.

In a second aspect, the present disclosure is directed to an aircraft including a fuselage, a plurality of seats in the fuselage and a modal restraint system including a plurality of seatbelt subsystems. Each seatbelt subsystem is adapted to secure an occupant to one of the seats. Each seatbelt subsystem includes a strap feeder unit and a strap selectively retractable into and extendable from the strap feeder unit. The strap is positionable adjacent to the occupant so as to dispose the occupant between the strap and the seat. The strap feeder unit is adapted to switch between a plurality of modes including a fixed mode and an unfixed mode. The strap is substantially unextendable from the strap feeder unit in the fixed mode. The strap is extendable from and retractable into the strap feeder unit in the unfixed mode. The strap feeder unit is in the fixed mode by default. The strap feeder unit is operable to switch to the unfixed mode in response to a user input, thereby increasing freedom of movement of the occupant relative to the seat.

In some embodiments, at least a portion of the seatbelt subsystems may be located in the cockpit or passenger cabin of the aircraft. In certain embodiments, the unfixed mode may include an inertia reel mode. In some embodiments, the modal restraint system may include a master release selector in communication with each of the seatbelt subsystems, the user input may include selection of the master release selector and the selection of the master release selector may cause or allow the strap feeder units of each of the seatbelt subsystems to switch to the unfixed mode. In certain embodiments, the master release selector may be located in the cockpit and selectable by a pilot. In some embodiments, the plurality of modes may include a retracted fixed mode and the strap feeder unit may be adapted to retract the strap into the strap feeder unit in the retracted fixed mode, thereby tightening the strap against the occupant. In such embodiments, the strap feeder units of each of the seatbelt subsystems may be operable to switch to the retracted fixed mode in response to a precautionary event. In certain embodiments, the aircraft may include a release selector in communication with the strap feeder unit, as well as a plurality of flight operation modes including a visual flight rules operation mode and an instrument flight rules operation mode. In such embodiments, the release selector may be disabled in response to switching to the instrument flight rules operation mode. In some embodiments, switching to the unfixed mode may increase the freedom of forward movement of the occupant relative to the seat.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2C are various views of a seatbelt subsystem in accordance with embodiments of the present disclosure;

FIGS. 3A-3C are side views of various modes of a seatbelt subsystem in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
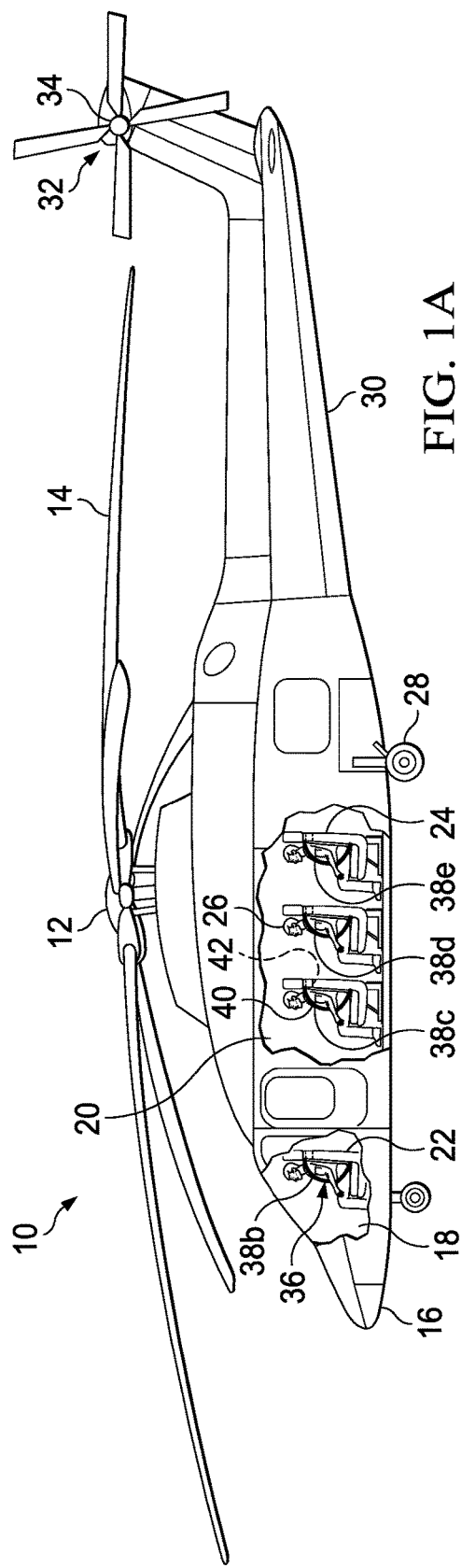
FIGS. 1A-1B are schematic illustrations of a rotorcraft implementing a modal restraint system in accordance with embodiments of the present disclosure.
Figure 1B:
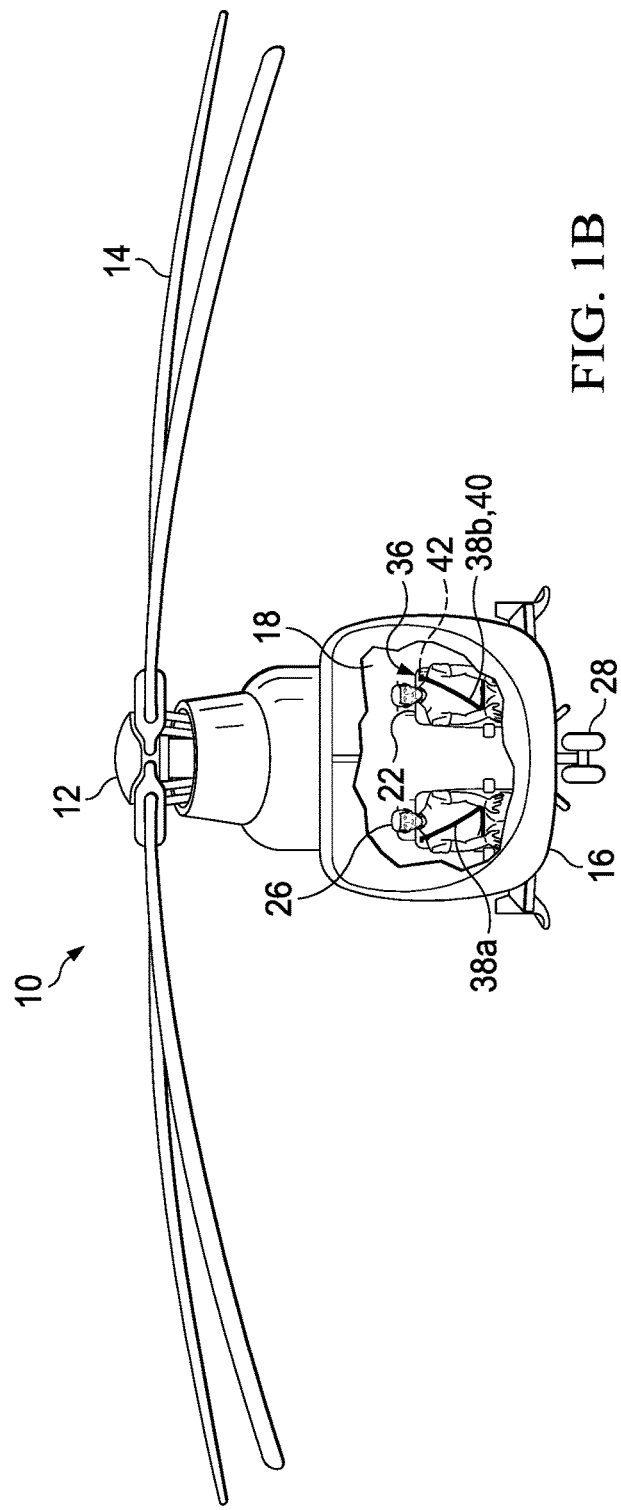

Referring to FIGS. 1A-1B in the drawings, a rotorcraft is schematically illustrated and generally designated 10. Rotorcraft 10 is a helicopter having a main rotor 12, which includes a plurality of rotor blade assemblies 14. Main rotor 12 is rotatable relative to a fuselage 16, which includes a cockpit 18 and a passenger cabin 20. Cockpit 18 and passenger cabin 20 include seats 22, 24, respectively, intended for occupants 26, such as pilots, crewmembers, passengers and the like. The pitch of rotor blade assemblies 14 can be collectively and/or cyclically manipulated to selectively control direction, thrust and lift of rotorcraft 10. A landing gear system 28 provides ground support for rotorcraft 10. A tailboom 30 extends from fuselage 16. A tail section 32 includes a tail rotor 34 that is rotatably coupled to the aft portion of tailboom 30. Tail rotor 34 controls the yaw of rotorcraft 10.

Rotorcraft 10 includes a modal restraint system 36, which includes seatbelt, or restraint, subsystems 38a-38e. Seatbelt subsystems 38a, 38b are located in cockpit 18 and seatbelt subsystems 38c-38e are located in passenger cabin 20. Each seatbelt subsystem 38a-38e is adapted to secure one of occupants 26 to a respective seat 22, 24. Each seatbelt subsystem 38a-38e includes a strap 40 that is selectively retractable into and extendable from a strap feeder unit 42. Seatbelt subsystems 38a-38e may be switched between a plurality of modes including a fixed mode and an unfixed mode. In fixed mode, strap 40 is substantially unextendable from strap feeder unit 42. In unfixed mode, strap 40 is extendable from and retractable into strap feeder unit 42. In some embodiments, the modes of seatbelt subsystems 38a-38e may include a retracted fixed mode in which strap 40 is retracted into strap feeder unit 42 to tighten strap 40 against occupants 26. In other embodiments, the modes of seatbelt subsystems 38a-38e may include an inertia reel mode, a type of unfixed mode, in which strap 40 is retractable into and extendable from strap feeder unit 42 unless strap 40 is pulled with a force sufficient to prevent strap feeder unit 42 from extending strap 40 any further, as may occur if the body of an occupant moves relative to rotorcraft 10 or seats 22, 24 with sufficient force.

In some embodiments, seatbelt subsystems 38a-38e are in fixed mode by default, or during normal operation of rotorcraft 10 in the absence of user, computer or other input to specify the mode of seatbelt subsystems 38a-38e. In these embodiments, seatbelt subsystems 38a-38e may switch to unfixed mode in response to user input, which increases the freedom of bodily movement of occupants 26 relative to their respective seats 22, 24, thereby enhancing the comfort and mobility of each occupant 26 when there is no perceived threat of a life-threatening acceleration event. The interchangeability of modal restraint system 36 between various modes provides occupants 26 with added comfort and mobility, while also fixedly securing occupants 26 to seats 22, 24 to prevent injury or loss of life should a life-threatening acceleration event occur.

It should be appreciated that rotorcraft 10 is merely illustrative of a variety of aircraft that can implement the embodiments disclosed herein. Indeed, modal restraint system 36 may be utilized on any aircraft having one or more occupants. Other aircraft implementations can include hybrid aircraft, tiltrotor aircraft, tiltwing aircraft, quad tiltrotor aircraft, gyrocopters, airplanes and the like. As such, those skilled in the art will recognize that modal restraint system 36 can be integrated into a variety of aircraft configurations. It should be appreciated that even though aircraft are particularly well-suited to implement the embodiments of the present disclosure, non-aircraft vehicles and devices can also implement the embodiments.

Figure 2C:
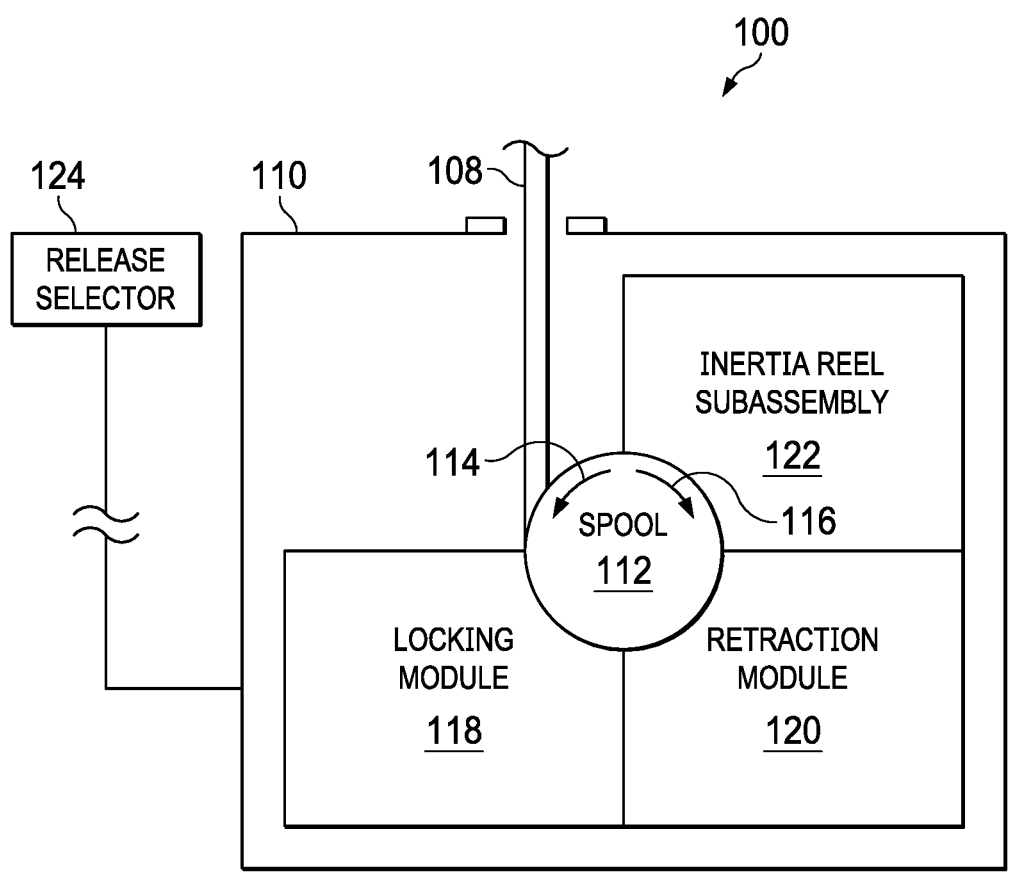

Referring to FIGS. 2A-2C in the drawings, a modal restraint system for an aircraft is schematically illustrated and generally designated 100. Modal restraint system 100 includes seatbelt subsystem 102, which secures occupant 104 to seat 106 using strap 108. Strap 108 is positionable adjacent to occupant 104 so as to at least partially dispose occupant 104 between seat 106 and strap 108. Strap 108 includes a torso, or shoulder or upper, strap positionable adjacent to the torso of occupant 104, and a lap, or lower, strap positionable adjacent to the lap region of occupant 104. Strap 108 is selectively retractable into and extendable from strap feeder unit 110. Strap feeder unit 110 is in fixed mode by default and is operable to switch to unfixed mode in response to user input, thereby increasing the freedom of forward movement of occupant 104 relative to seat 106. Although strap feeder unit 110 is shown to be inside of seat 106 near the shoulder of occupant 104, strap feeder unit 110 may be located elsewhere proximate to seat 106. It will be appreciated by one of ordinary skill in the art that strap 108 is merely illustrative of a three-point restraint system, although in other embodiments the restraint system may include more or less than three fixation points.

Strap feeder unit 110 includes a spool 112 operable to rotate in either a first direction 114 or a second direction 116 to wind or unwind strap 108 thereabout, respectively. Strap feeder unit 110 includes a locking module 118 that is operable to engage, mechanically and/or electromagnetically, with spool 112 when strap feeder unit 110 is in fixed mode to impede spool 112 from rotating in second direction 116, thereby rendering strap 108 substantially unextendable. Strap feeder unit 110 includes a retraction module 120 that is operable to retract strap 108 into strap feeder unit 110 by, for example, rotating spool 112 in first direction 114, thereby tightening strap 108 against occupant 104. The fixed mode may include a retracted fixed mode in which retraction module 120 retracts strap 108 into strap feeder unit 110. In retracted fixed mode, the slack in strap 108 may be substantially reduced or minimized such that less than two fingers fit between strap 108 and the body of occupant 104. Retraction module 120 may preload strap 108 using an electromagnetic tensioner, a mechanical pretensioner or any other strap-retracting technique or mechanism. The unfixed mode may include an inertia reel mode implemented by an inertia reel subassembly 122 that is selectively engageable with spool 112. Inertia reel subassembly 122 may utilize a weighted pendulum, a centrifugal clutch, an electromagnetic mechanism or any other inertia reel implementations known by one of ordinary skill in the art. Depending on the embodiment, strap feeder unit 110 may switch to either unfixed mode or inertia reel mode in response to the user input.

Seatbelt subsystem 102 includes a release selector 124 in communication with strap feeder unit 110. Release selector 124 may be any input device such as a voice-activated input, lever, knob, foot pedal or pull cord. Release selector 124 may be in mechanical, electrical, wireless, computer or any other type of communication with strap feeder unit 110. The user input that causes seatbelt subsystem 102 to switch to unfixed mode or inertia reel mode may be the selection of release selector 124 by occupant 104. Release selector 124 may be switchable between a release position and an unrelease position. In such embodiments, the user input causing seatbelt subsystem 102 to switch to unfixed mode or inertia reel mode may be switching release selector 124 from the unrelease position to the release position. In the illustrated embodiment, release selector 124 is a button 126. Occupant 104 may press button 126 to cause seatbelt subsystem 102 to switch to unfixed mode or inertia reel mode. Furthermore, strap feeder unit 110 may switch to default fixed mode or retracted fixed mode in response to occupant 104 releasing button 126. While button 126 is shown to be proximate to strap 108, button 126 may be located elsewhere, such as on a cellular phone or other personal communication device of occupant 104. Button 126 may be a mechanical button or a digital button, such as an icon on a touchscreen.

Referring to FIGS. 3A-3C in the drawings, a sequence of events illustrating the various modes of seatbelt subsystem 102 is schematically illustrated. In FIG. 3A, seatbelt subsystem 102 is in default fixed mode or retracted fixed mode. In either of these modes, occupant 104 is in a substantially fixed and secured position against seat 106 to prevent forward, upward or downward motion of the head or body of occupant 104 should an acceleration event, such as an HIC event or a life-threatening acceleration event, occur. Comfort and mobility is limited while seatbelt subsystem 102 is in fixed mode or retracted fixed mode. To remedy this lack of comfort and mobility, occupant 104 may press release button 126, as shown in FIG. 3B, to cause strap feeder unit 110 to switch to either unfixed mode or inertia reel mode, as shown in FIG. 3C, thus providing occupant 104 with freedom of forward movement. Such freedom of forward movement provides occupant 104 with additional comfort and allows occupant 104 to extend his or her area of reach, including looking out of nearby windows 122.

In some embodiments, seatbelt subsystem 102 may be in unfixed mode or inertia reel mode temporarily before reverting or switching back to fixed mode or retracted fixed mode. For example, strap feeder unit 110 may switch to default fixed mode or retracted fixed mode in response to a cessation of user input (i.e., occupant 104 stops pressing button 126). In other embodiments, strap feeder unit 110 may revert back to fixed mode or retracted fixed mode in response to a cessation of a predetermined time period. For example, seatbelt subsystem 102 may stay in unfixed mode or inertia reel mode for a time period that commences upon occupant 104 selecting button 126, as shown in FIG. 3B, and ending at a predetermined period of time after occupant 104 selects button 126. The predetermined time period may be on the order of seconds, minutes or hours, depending on the embodiment. In other embodiments, pressing button 126 a first time may cause seatbelt subsystem 102 to switch to unfixed mode or inertia reel mode and pressing button 126 a second time may cause seatbelt subsystem 102 to revert or switch to default fixed mode or retracted fixed mode.

In yet other embodiments, strap feeder unit 110 may revert or switch to default fixed mode or retracted fixed mode in response to a precautionary event, or collision-risk or acceleration-risk condition, thereby reducing the freedom of movement of occupant 104 relative to seat 106 of the aircraft. The precautionary event, which triggers seatbelt subsystem 102 to return to retracted fixed mode, may anticipate a life-threatening acceleration event, such as a hard landing, a collision, an uncontrolled descent, extreme turbulence, an HIC event or any other acceleration event with the potential to be injurious or fatal to a human being. It will be appreciated by one of ordinary skill in the art that the precautionary event triggering seatbelt subsystem 102 to switch to retracted fixed mode may occur well before acceleratory, inertia or other involuntary motion of occupant 104 caused by the acceleration of the aircraft, thereby reducing the delay in securing occupant 104 to seat 106 as compared to traditional inertia reel seatbelts. Because the precautionary event may anticipate or occur prior to a life-threatening acceleration event, returning to retracted fixed mode in response to a precautionary event reduces the freedom of movement of occupant 104 during a life-threatening acceleration event, thereby enhancing the safety of occupant 104. Release selector 124 may also be disabled in response to a precautionary event, thereby preventing strap feeder unit 110 from switching to unfixed mode or inertia reel mode.

Figure 4:
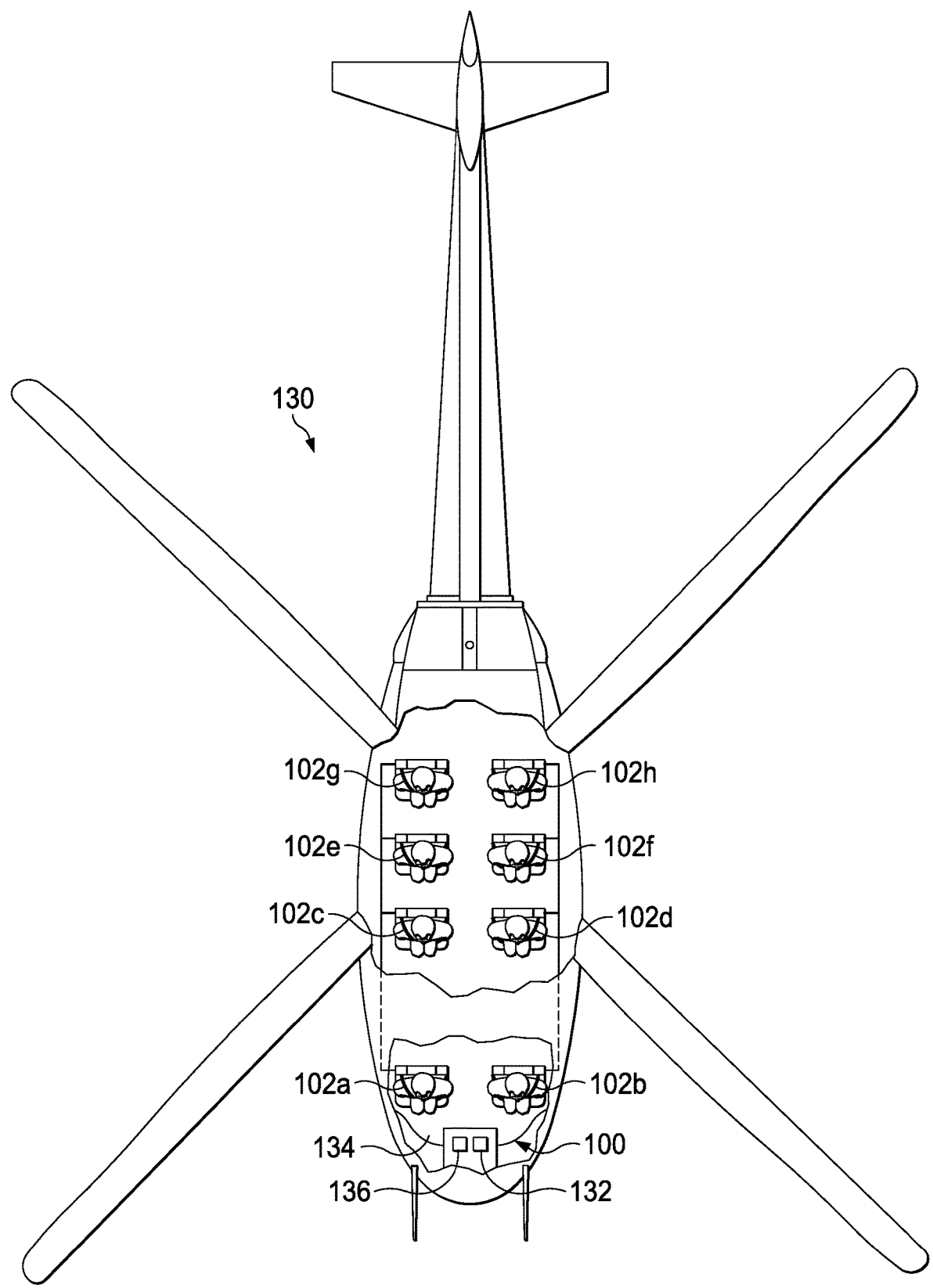
FIG. 4 is a top view of a rotorcraft implementing a modal restraint system in accordance with embodiments of the present disclosure.

Referring to FIG. 4 in the drawings, a rotorcraft implementing modal restraint system 100 is schematically illustrated and generally designated 130. Modal restraint system 100 includes a master release selector 132 located in cockpit 134. Master release selector 132 may be selected by an occupant of cockpit 134, such as a pilot. Master release selector 132 is in communication with each of seatbelt subsystems 102a-102h, including by mechanical, electrical, computer, wireless or any other form of communication. Selection of master release selector 132 causes or allows the strap feeder units of all or a portion of seatbelt subsystems 102a-102h to switch to unfixed mode or inertia reel mode. In some embodiments, master release selector 132 may override the individual release selectors operated by the respective occupants of each of seatbelt subsystems 102a-102h. The strap feeder units of each of seatbelt subsystems 102a-102h may additionally be operable to switch to retracted fixed mode in response to a precautionary event. In some embodiments, master release selector 132 and/or the release selector(s) for each of seatbelt subsystems 102a-102h may be disabled in response to rotorcraft 130 switching to instrument flight rules operation mode. Modal restraint system 100 may also include master lock selector 136, enabling an occupant of cockpit 134 to select master release selector 132 to switch modal restraint system 100 to unfixed mode or inertia reel mode and select master lock selector 136 to switch modal restraint system 100 to fixed mode or retracted fixed mode. Furthermore, each of seatbelt subsystems 102a-102h may include both a release selector 124 and a lock selector (not shown), which switches the respective seatbelt subsystem 102a-102h to fixed mode or retracted fixed mode. The default mode of modal restraint system 100 may be reversible or changeable by a pilot, ground technician, occupant or other person. Furthermore, the default mode of seatbelt subsystems 102a-102h may be individually or collectively reversible or changeable. For example, a pilot may change the default mode of modal restraint system 100 from unfixed mode to fixed mode, or vice versa, depending on the circumstances.

Figure 5A:
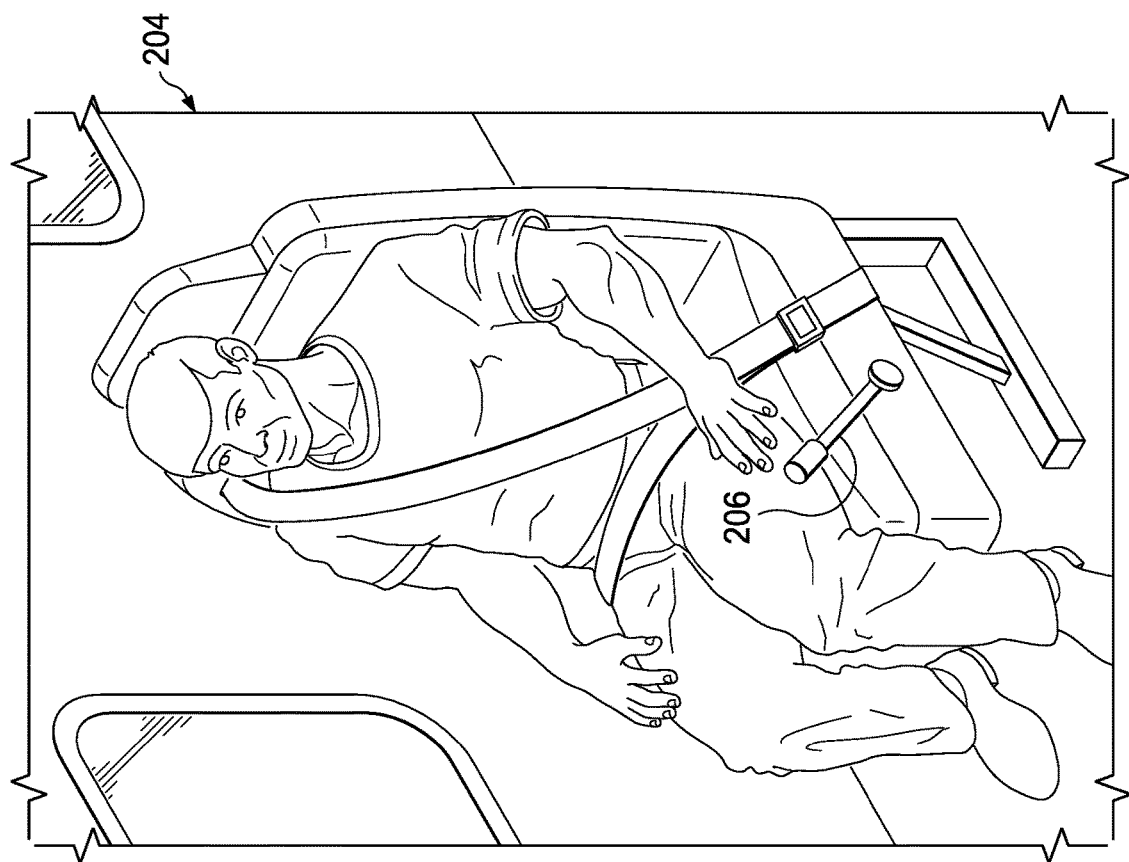
FIGS. 5A-5D are various views of seatbelt subsystems having different configurations in accordance with embodiments of the present disclosure.
Figure 5B:
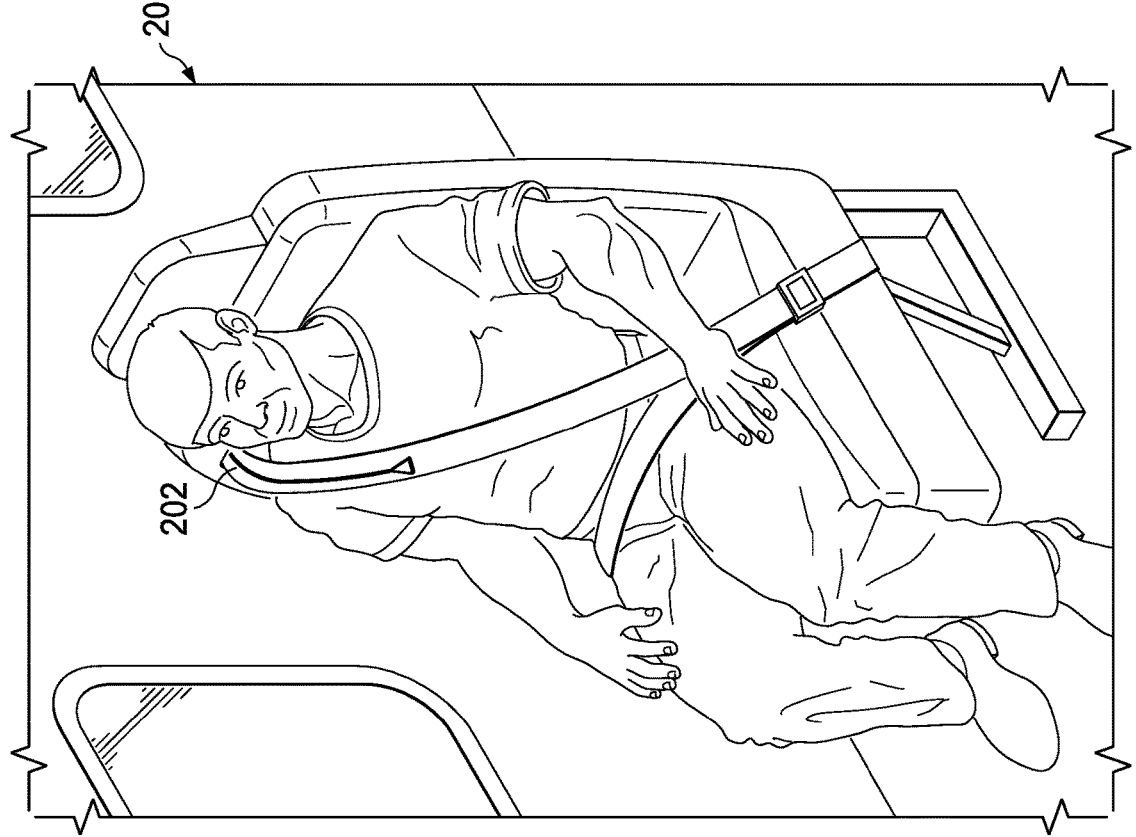
Figure 5D:
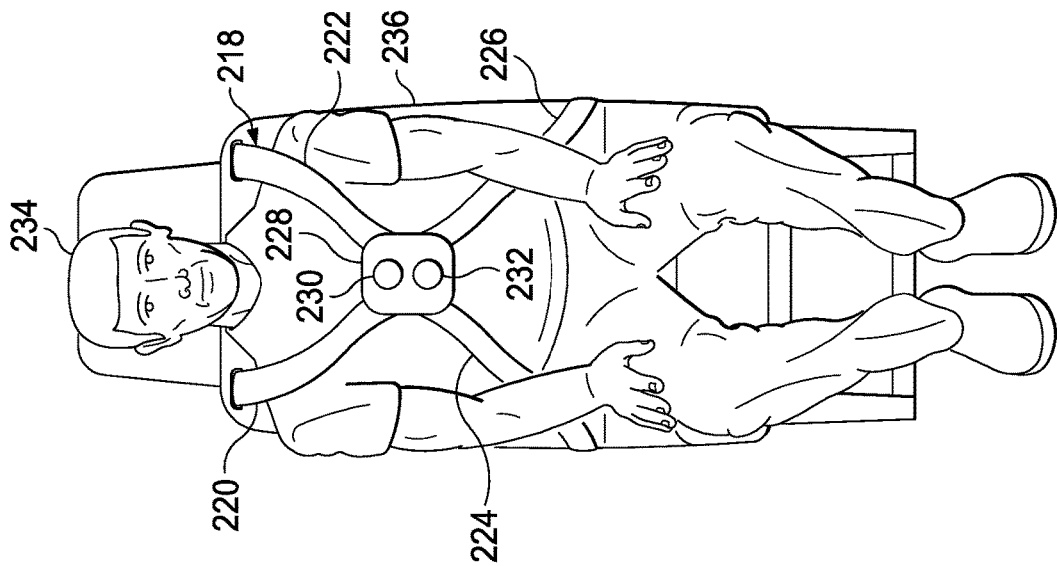
Figure 5C:
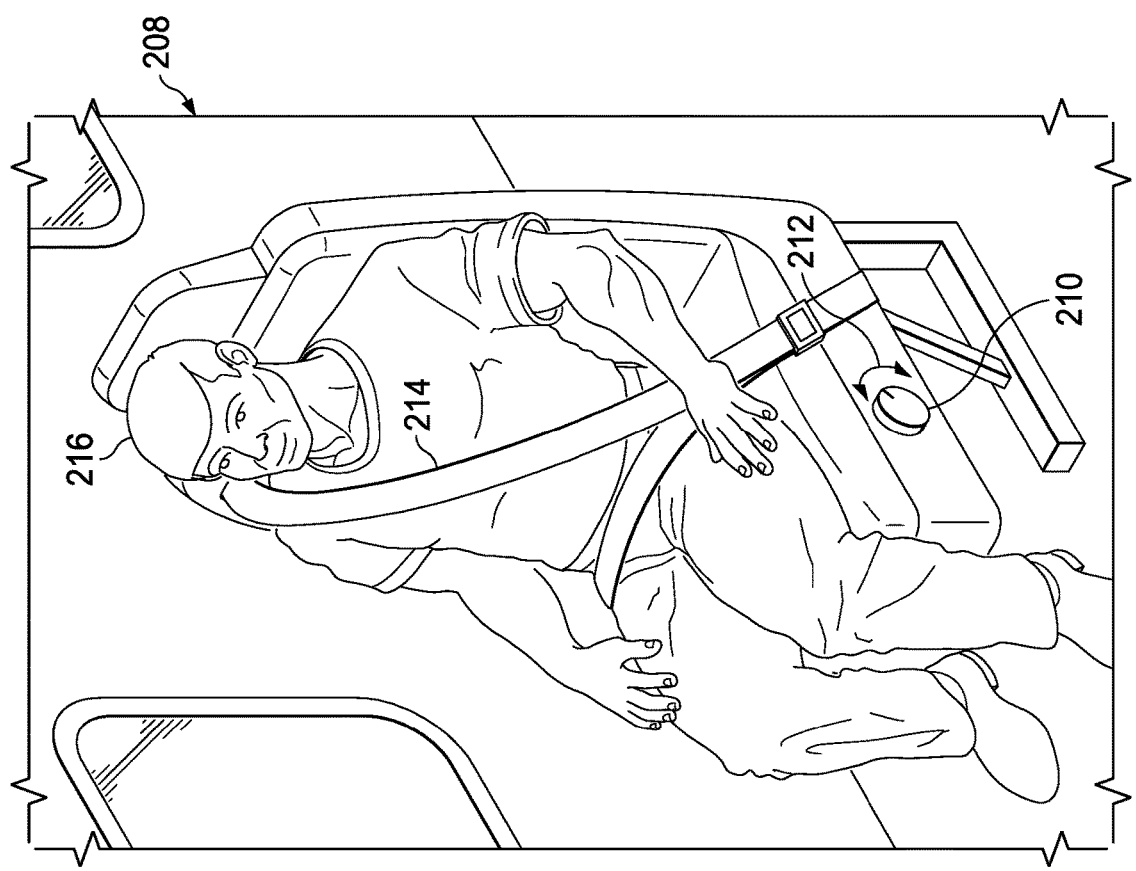

Referring to FIGS. 5A-5D in the drawings, various configurations of a seatbelt subsystem are schematically illustrated. In FIG. 5A, seatbelt subsystem 200 includes a pull cord 202. Pull cord 202 may be a release selector. In FIG. 5B, seatbelt subsystem 204 includes a lever 206. In some embodiments, lever 206 may be a release selector rotatable between a release position and an unrelease position, and rotating lever 206 from the unrelease position to the release position may cause seatbelt subsystem 204 to switch to unfixed mode or inertia reel mode. In FIG. 5C, seatbelt subsystem 208 includes a rotatable knob 210. Knob 210 is rotatable in either of directions 212 to either loosen or tighten strap 214. For example, if occupant 216 perceives the possibility of an imminent acceleration event, occupant 216 may rotate knob 210 to tighten strap 214. Conversely, occupant 216 may rotate knob 210 to loosen strap 214 if he or she desires comfort or mobility. Knob 210 allows occupant 216 to more precisely select the looseness or tightness of strap 214 within a range of looseness/tightness settings. In other embodiments, seatbelt subsystem 208 may include a foot pedal release selector. In FIG. 5D, seatbelt subsystem 218 includes four torso straps 220, 222, 224, 226, one or more of which are retractable into or extendable from one or more strap feeder units (not visible). In the illustrated embodiment, torso straps 220, 222, 224, 226 may have individual buckles that couple with hub unit 228, which may include either or both of release selector 230 or a lock selector 232, the latter of which switches seatbelt subsystem 218 to fixed mode or retracted fixed mode. In contrast to previously illustrated embodiments, hub unit 228 is located proximate to the chest area of occupant 234, placing release selector 230 and/or lock selector 232 within easy reach of occupant 234.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A modal restraint system including a plurality of seatbelt subsystems, each seatbelt subsystem configured to secure an occupant of a seat of an aircraft, comprising:
   a master release selector in communication with each of the seatbelt subsystems;
   wherein, each seatbelt subsystem comprises:
   a strap feeder unit; and a strap selectively retractable into and extendable from the strap feeder unit, the strap positionable adjacent to the occupant so as to at least partially dispose the occupant between the strap and the seat;

wherein, the strap feeder unit is adapted to switch between a plurality of modes including a fixed mode and an unfixed mode, the strap substantially unextendable from the strap feeder unit in the fixed mode, the strap extendable from and retractable into the strap feeder unit in the unfixed mode;

wherein, the strap feeder unit is in the fixed mode by default;

wherein, the strap feeder unit is operable to switch to the unfixed mode in response to a user input, thereby increasing freedom of movement of the occupant relative to the seat of the aircraft; and wherein, the master release selector is selectable to switch the strap feeder unit of each seatbelt subsystem to the unfixed mode.

2. The modal restraint system as recited in claim 1 wherein the strap feeder unit further comprises a spool operable to rotate in first and second directions to wind and unwind the strap thereabout, respectively.

3. The modal restraint system as recited in claim 2 wherein the strap feeder unit further comprises a locking module, the locking module engaging with the spool when the strap feeder unit is in the fixed mode to impede the spool from rotating in the second direction such that the strap is substantially unextendable.

4. The modal restraint system as recited in claim 2 wherein the plurality of modes further comprise a retracted fixed mode and the strap feeder unit further comprises a retraction module adapted to rotate the spool in the first direction to retract the strap into the strap feeder unit in the retracted fixed mode, thereby tightening the strap against the occupant.

5. The modal restraint system as recited in claim 2 wherein the unfixed mode is an inertia reel mode; and wherein the strap feeder unit further comprises an inertia reel subassembly selectively engagable with the spool in the inertia reel mode.

6. The modal restraint system as recited in claim 1 wherein the strap further comprises a torso strap positionable adjacent to the torso of the occupant and a lap strap positionable adjacent to the lap region of the occupant.

7. The modal restraint system as recited in claim 1 wherein the plurality of modes further comprise a retracted fixed mode and wherein the strap feeder unit is adapted to retract the strap into the strap feeder unit in the retracted fixed mode, thereby tightening the strap against the occupant.

8. The modal restraint system as recited in claim 1 wherein the strap feeder unit is further operable to return to the fixed mode in response to a cessation of the user input.

9. The modal restraint system as recited in claim 1 wherein the strap feeder unit is further operable to return to the fixed mode in response to a cessation of a predetermined time period.

10. The modal restraint system as recited in claim 1 wherein the strap feeder unit automatically returns to the fixed mode in response to a precautionary event.

11. The modal restraint system as recited in claim 1 further comprising a release selector in communication with the strap feeder unit and wherein the user input further comprises selection of the release selector by the occupant.

12. The modal restraint system as recited in claim 11 wherein the release selector is switchable between a release position and an unrelease position; and wherein the user input further comprises switching the release selector from the unrelease position to the release position.

13. The modal restraint system as recited in claim 11 wherein the release selector further comprises an input device selected from the group consisting of a button, a lever, a knob or a pull cord.

14. The modal restraint system as recited in claim 11 wherein the release selector is proximate to the seat.

15. The modal restraint system as recited in claim 11 wherein the release selector is disabled in response to a precautionary event, thereby preventing the strap feeder unit from switching to the unfixed mode.

16. An aircraft comprising:

a fuselage;

a plurality of seats in the fuselage; and a modal restraint system including a plurality of seatbelt subsystems and a master release selector in communication with each of the seatbelt subsystems, each seatbelt subsystem adapted to secure an occupant to one of the seats, each seatbelt subsystem comprising:

a strap feeder unit; and a strap selectively retractable into and extendable from the strap feeder unit, the strap positionable adjacent to the occupant so as to at least partially dispose the occupant between the strap and the seat;

wherein, the strap feeder unit is adapted to switch between a plurality of modes including a fixed mode and an unfixed mode, the strap substantially unextendable from the strap feeder unit in the fixed mode, the strap extendable from and retractable into the strap feeder unit in the unfixed mode;

wherein, the strap feeder unit is in the fixed mode by default;

wherein, the strap feeder unit is operable to switch to the unfixed mode in response to a user input, thereby increasing freedom of movement of the occupant relative to the seat; and wherein, the master release selector is selectable to switch the strap feeder unit of each seatbelt subsystem to the unfixed mode.

17. The aircraft as recited in claim 16 wherein the fuselage further comprises a cockpit; and wherein the master release selector is located in the cockpit.

18. The aircraft as recited in claim 16 wherein the plurality of modes further comprise an inertia reel unfixed mode and a retracted fixed mode; and wherein the strap feeder units of each of the seatbelt subsystems are operable to switch to the retracted fixed mode in response to a precautionary event.

19. The aircraft as recited in claim 16 further comprising:

a release selector in communication with the strap feeder unit; and a plurality of flight operation modes including a visual flight rules operation mode and an instrument flight rules operation mode;

wherein the release selector is disabled in response to switching to the instrument flight rules operation mode.

* * * * *